(12) United States Patent
Nielsen et al.

(10) Patent No.: US 11,728,650 B2
(45) Date of Patent: Aug. 15, 2023

(54) VOLTAGE CONTROL ON A WIND TURBINE TRANSFORMER WITH MULTIPLE WINDINGS

(71) Applicant: VESTAS WIND SYSTEMS A/S, Aarhus N (DK)

(72) Inventors: John Godsk Nielsen, Hornslet (DK); Torben Møller Hansen, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 33 days.

(21) Appl. No.: 17/372,144

(22) Filed: Jul. 9, 2021

(65) Prior Publication Data

US 2022/0014023 A1    Jan. 13, 2022

(30) Foreign Application Priority Data

Jul. 10, 2020    (DK) .......................... PA 2020 70477

(51) Int. Cl.
*H02J 3/18*    (2006.01)
*F03D 9/25*    (2016.01)
(Continued)

(52) U.S. Cl.
CPC .............. *H02J 3/18* (2013.01); *F03D 9/255* (2017.02); *H02K 7/1838* (2013.01); *H02M 7/44* (2013.01); *H02P 9/02* (2013.01)

(58) Field of Classification Search
CPC .......... H02J 3/18; F03D 9/255; H02K 7/1838; H02M 7/44; H02P 9/02
See application file for complete search history.

(56) References Cited

U.S. PATENT DOCUMENTS 5,225,712 A *  7/1993  Erdman ................ H02J 3/1842
                                                           290/55
10,581,247 B1 *  3/2020  Kolhatkar ............... H02J 3/386
(Continued)

FOREIGN PATENT DOCUMENTS

EP    2503146 A1    9/2012
EP    3046204 A1    7/2016

OTHER PUBLICATIONS

European Patent Office, Extended European Search Report for Application 21184251.3 dated Nov. 16, 2021.
(Continued)

*Primary Examiner* — Sean Gugger
(74) *Attorney, Agent, or Firm* — Patterson + Sheridan, LLP (57) ABSTRACT

The invention relates to a method for operating a power system of a wind turbine. The power system comprises first and second parallel connected DC-to-AC converters and at least one transformer, where each transformer comprises a primary section connected to a power line, and where the at least one transformer comprises first and second secondary sections connected to outputs of the respective first and second DC-to-AC converters. The method comprises providing a reactive correction reference, changing first and second reactive powers generated by the respective first and second DC-to-AC converters according to the reactive correction reference, so that one of the first and second reactive powers is increased while the other is decreased with amounts corresponding to the reactive correction reference so that the first and second reactive powers are unequal.

20 Claims, 6 Drawing Sheets

(51) Int. Cl.
*H02K 7/18* (2006.01)
*H02M 7/44* (2006.01)
*H02P 9/02* (2006.01)

(56) References Cited

U.S. PATENT DOCUMENTS

| | | | |
|---|---|---|---|
| 2012/0061959 A1 | 3/2012 | Yasugi et al. | |
| 2012/0242295 A1* | 9/2012 | Bech | H02J 3/388 |
| | | | 322/87 |
| 2013/0162047 A1 | 6/2013 | O'Brien et al. | |
| 2013/0200714 A1* | 8/2013 | Pan | H02J 1/102 |
| | | | 307/82 |
| 2013/0229056 A1* | 9/2013 | Teichmann | H02J 3/50 |
| | | | 307/18 |
| 2013/0270823 A1 | 10/2013 | Hannon | |
| 2016/0268831 A1 | 9/2016 | Spooner et al. | |

OTHER PUBLICATIONS

Danish Patent and Trademark Office 1st Technical Examination for Application No. PA 2020 70477 dated Jan. 8, 2021.

* cited by examiner

VOLTAGE CONTROL ON A WIND TURBINE TRANSFORMER WITH MULTIPLE WINDINGS

FIELD OF THE INVENTION

The invention relates to control of wind turbines, particular voltage control on the on the power output.

BACKGROUND OF THE INVENTION

The power output of a wind turbine may supply power to an auxiliary system of the wind turbine. The voltage at the power output of the wind turbine is affected by the grid voltage. In some situations, the grid voltage may increase leading to an increased voltage at the wind turbine's power output terminals. The auxiliary circuit, which is exposed to the same voltage increase, may not be dimensioned to operate with voltages above a certain limit. Accordingly, it is a problem that grid voltage variation may lead to voltages levels at the power terminals of the auxiliary circuit which exceed the voltage limit of the auxiliary circuit or which are lower than a desired voltage level.

SUMMARY OF THE INVENTION

It is an object of the invention to improve wind turbines, particularly grid connected wind turbines so that they at able to continue operation despite high/low grid voltages or so that wind turbine components such as components of the auxiliary circuit are not exposed to over/under voltages.

In a first aspect of the invention there is provided a method for operating a power system of a wind turbine, wherein the power system comprises:
 first and second parallel connected DC-to-AC converters and
 at least one transformer, where each transformer comprises a primary section connected to a power line, and where the at least one transformer comprises first and second secondary sections connected to outputs of the respective first and second DC-to-AC converters, the method comprises
 providing a reactive correction reference,
 changing first and second reactive powers generated by the respective first and second DC-to-AC converters according to the reactive correction reference, so that one of the first and second reactive powers is increased while the other is decreased with amounts corresponding to the reactive correction reference so that the first and second reactive powers are unequal.

Advantageously, by changing the first and second reactive power magnitudes unequally, possibly so that one of the reactive powers is capacitive while the other is inductive, it is possible to change the voltages at the input to the first and second secondary transformer sections independently, e.g. with an aim to keep one of the voltages close to a desired level.

According to an embodiment, the method comprises changing the first and second reactive powers to achieve different signs of the first and second reactive powers.

Advantageously, by controlling the reactive powers so that one is inductive and the other is capacitive, it is possible to merely circulate an amount of the reactive power. For example, if the magnitudes of the reactive powers are equal, but the reactive powers have opposite signs, the amount of reactive power injected to the power line approaches zero.

According to an embodiment, the reactive correction reference is a user determined reference. Advantageously, the reactive correction reference may be set to a desired level, e.g. for the purpose of generating desired changes in the generated reactive powers, e.g. for the purpose of testing the power converters being exposed to a desired level of the reactive powers.

According to an embodiment, the correction reference is determined based on a comparison of a voltage level at an input of the first secondary section, alternatively the second secondary section, and a voltage reference for a desired voltage level at the input of the first secondary section, alternatively the second secondary section.

Advantageously, by determining the correction reference according to the voltage reference, the voltage at the input of the first secondary section, alternatively the second secondary section can be controlled with the aim of keeping the voltage close to the reference.

According to an embodiment, the change of the first and second reactive powers causes an increase of the voltage level at the input of the first secondary section and a decrease of the voltage level at the input of the second secondary section, or vice versa.

According to an embodiment, the method comprises determining a condition indicating a need for changing the voltage level at the input of the first secondary section, alternatively the second secondary section, towards the desired voltage level at the input of the first secondary section, alternatively the second secondary section.

According to an embodiment, the condition is determined based on a voltage change on the power line, or a related voltage change.

For example, if the power line voltage increases, it is possible to counteract the related increase at the input of the first or second secondary sections by controlling the reactive powers according to an embodiment.

According to an embodiment, the method comprises changing an amount of active power supplied by the first and/or the second DC-to-AC converter to the first and second secondary transformer sections dependent on the first reactive power and/or the second reactive power.

For example by adjusting the active powers down, the reactive powers can be increases without exceeding the apparent power capacity of the power converters.

According to an embodiment, the change of the active power of the first and/or the second DC-to-AC converter is determined dependent on the first and/or second reactive power and an apparent power capacity of the DC-to-AC power converters.

According to an embodiment, the power system comprises controllers arranged to control the first and second reactive powers of the respective first and second DC-to-AC converters based on respective first and second reactive references, and wherein the method comprises
 changing the first and second reactive references according to the reactive correction reference, so that one of the first and second reactive references is increased while the other is decreased, thereby causing the change of the first and second reactive powers.

According to an embodiment, the least one transformer, comprises first and second transformers, where each of the transformers comprises one of the primary sections, where the first transformer comprises the first secondary section connected to the output of the first DC-to-AC converter, and where the second transformer comprises the second secondary section connected to the output of the second DC-to-AC converter.

According to an embodiment, the first and second secondary sections are secondary and tertiary sections, respectively, of a three-winding transformer.

A second aspect of the invention relates to a control system comprising first and second parallel connected DC-to-AC converters and at least one transformer, where each transformer comprises a primary section connected to a power line, and where the at least one transformer comprises first and second secondary sections connected to outputs of the respective first and second DC-to-AC converters, and where the control system is arranged to perform the method according to the first aspect.

A third aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF AN EMBODIMENT

Figure 1:
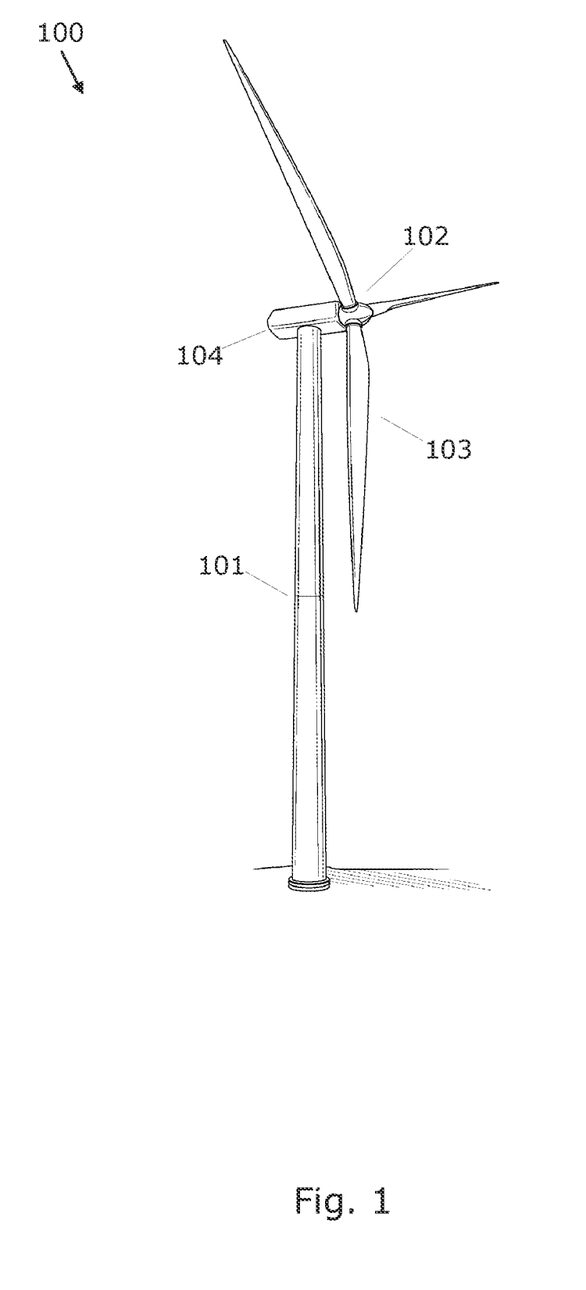
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The drive train comprises the shaft connecting the rotor 102 with the gearbox or the generator. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the utility grid.

Figure 2A:
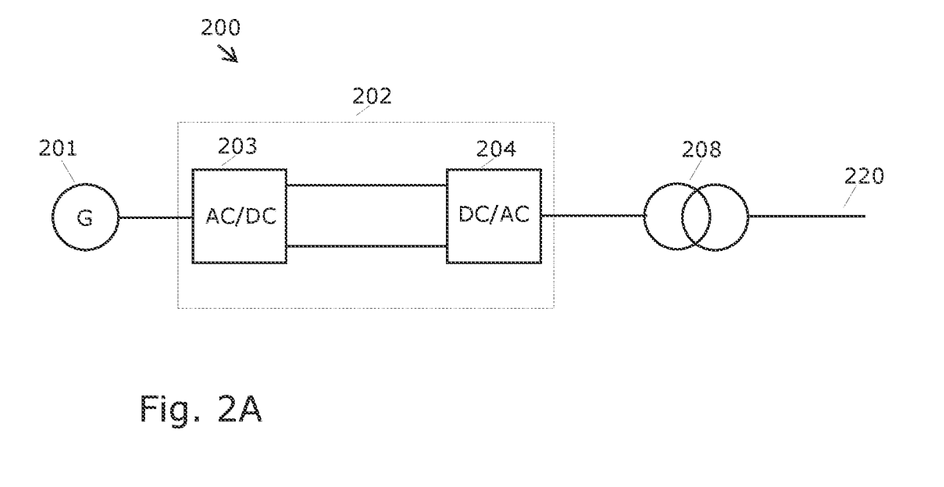
FIG. 2A shows an example of a power system of the wind turbine.

FIG. 2A shows an example of a power system 200 of the wind turbine 100 which comprises the generator 201 and a power converter 202. The power converter 202 comprises a generator side converter 203 and a line side converter 204.

The output AC current from the line side converter 204 is supplied via at least one wind turbine transformer 208 to the power line 220. For example, the at least one transformer comprises two or more parallel connected two-winding transformers. In another example, the at least one transformer comprises a three-winding transformer.

The power line 220 may be a medium voltage cable power collection network which receives power from other wind turbines 100. In an example, the power line 220 may be connected with a high voltage transmission network via a further transformer.

Figure 2B:
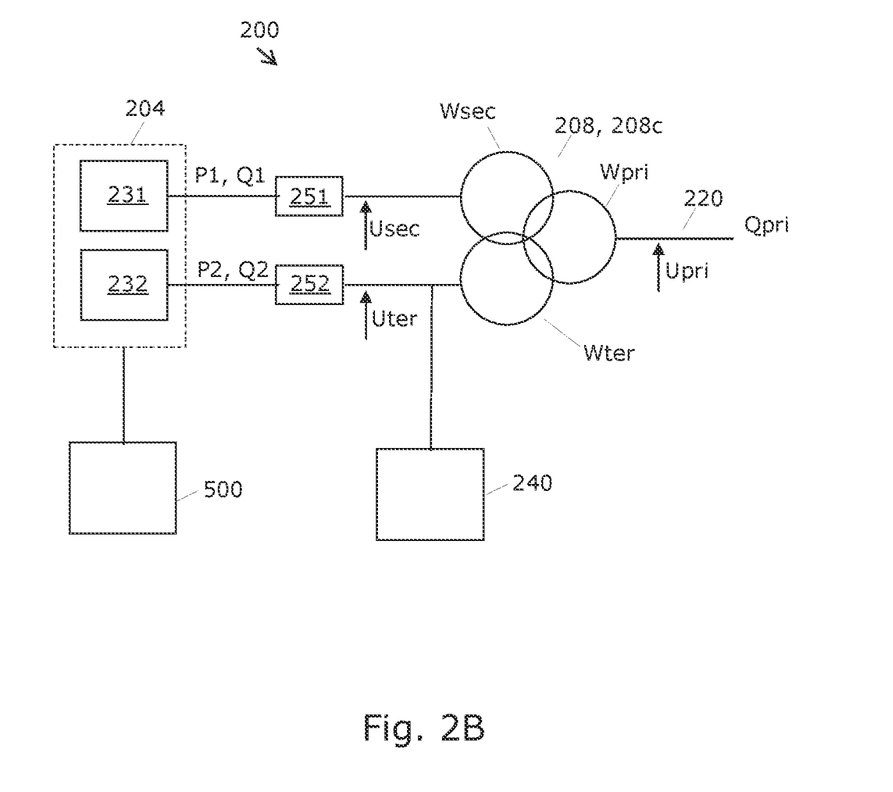
FIG. 2B shows another example of the power system, or a part of the power system, FIG. 3A show the relation between changes in reactive power and voltages.

FIG. 2B shows another example of the power system 200, or a part of the power system 200. In this example, the line side converter 204 comprises first and second DC-to-AC converters 231, 232, which are connected in parallel. The parallel connection enables the DC-to-AC converters 231, 232 to processes a fraction such as 50% of the total output power of the line side converter. The first and second DC-to-AC converters 231, 231 are connected with the generator side converter 203 which is not shown in FIG. 2B for convenience.

The at least one transformer 208, here a three-winding transformer 208c, comprises a primary section Wpri connected to the power line 220, and secondary and tertiary sections Wsec, Wter connected to outputs of the respective first and second DC-to-AC converters. Accordingly, the primary, secondary and tertiary sections are inductively connected.

The power system according to this example, further comprises first and second filters 251, 252, each of them comprising filter inductors and filter capacitors. The filters 251, 252 are arranged between the first and second DC-to-AC converters 231, 232 and the secondary and tertiary sections Wsec, Wter, respectively, to prove waveform smoothening of the output voltages of the line side converter 204.

The output of the first DC-to-AC converter 231, alternatively the second DC-to-AC converter 232, is connected to an auxiliary system 240. The auxiliary system comprises various power consumers of the wind turbine, such as cooling and heating systems, pitch actuators, components of the power converter such as converter heating systems and other electrical consumers. The auxiliary system is powered via a small fraction of the power provided via the first second DC-to-AC converter and/or the secondary or tertiary transformer sections.

At some locations, grid requirements allow larger deviations of the grid voltage relative to the nominal grid voltage than grid requirements at other locations. For example +/−15% percent voltage deviations may be allowed at some locations instead of default +/−10% deviations.

In other situations, the grid voltage may extend beyond the steady state voltage range, e.g. due to a grid fault.

In FIG. 2B, the primary side voltage Upri corresponds to the grid voltage or proportional with the grid voltage. Accordingly, the tertiary voltage Uter is directly related to the primary side voltage Upri via the transformer connection.

The auxiliary system 240 may be designed to operate within a given voltage range and, therefore, may not be able to operate in an extended range. A possible way to change the tertiary voltage is to inject or absorb an amount of reactive power Qpri to the grid and thereby control the tertiary voltage Uter. However, such an exchange of the reactive grid power Qpri may be not allowed, e.g. due to grid code requirements.

Figure 3A:
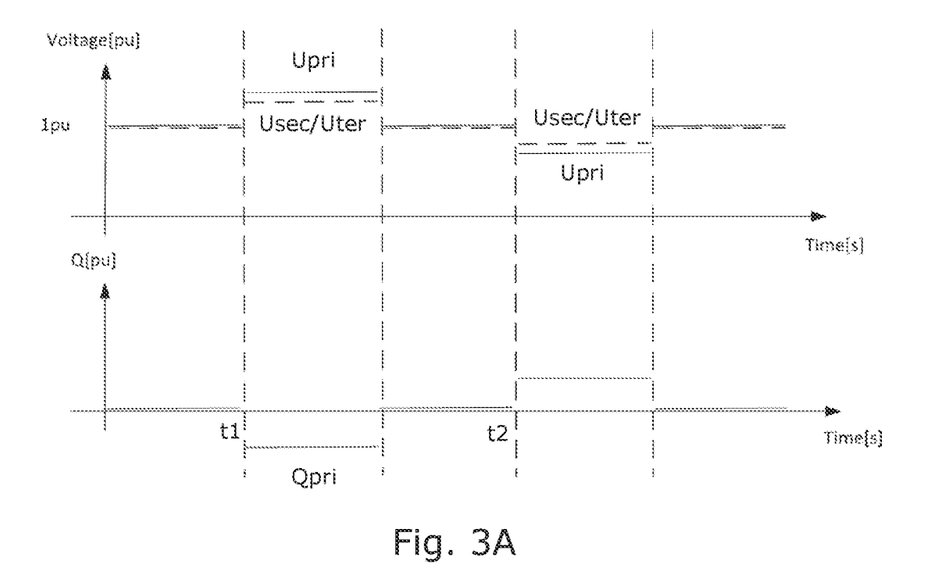

FIG. 3A shows a situation where the grid voltage increases at t1, which leads to an increase of the primary side voltage Upri, and consequently and increase of the secondary side voltages Usec and Uter corresponding to the transformer ratio. In order to limit the increase of Usec and Uter, the line side converter 204 is controlled to absorb reactive power Qpri or to change a present reactive power level Qpri. The absorption of reactive power generates a voltage drop over the secondary side windings, thereby reducing the secondary side voltages Usec and Uter relative to the primary side voltage Upri.

Equivalently, at t2, the grid voltage decreases, which could lead to unacceptable low secondary side voltages Usec and/or Uter. In order to increase Usec and/or Uter, e.g. so that the voltages are kept within a desired range, the line side converter 204 is controlled to deliver reactive power Qpri to the grid. The injection of reactive power to the grid generates a voltage drop from the secondary to the primary side, thereby increasing the secondary side voltages Usec and Uter relative to the primary side voltage Upri.

Thus, by controlling the line side converter 204 to change its absorption or injection of reactive power Qpri, the tertiary side voltage level Uter can be maintained within a desired range, e.g. close to 1 pu, as long as there are no restrictions on the primary side reactive power Qpri. Consequently, if there are restrictions on the amount of delivered or absorbed reactive grid power, it may not be possible to maintain the secondary and/or tertiary side voltage levels Usec/Uter within a desired range.

Figure 3B:
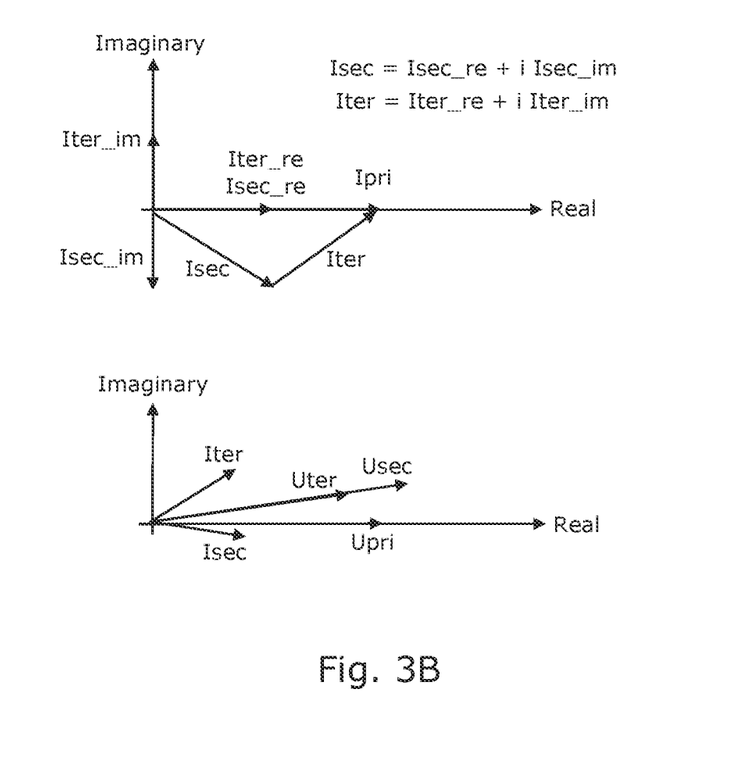
FIG. 3B shows current phasors and voltage phasors for illustrating the invention.

FIG. 3B shows an example of current phasors with the secondary and tertiary voltages aligned to the real axis (upper illustration) and voltage phasors with the primary voltage aligned to the real axis (lower illustration) for voltages and current on the primary, secondary and tertiary transformer windings Wpri, Wsec, Wter. Magnitudes are in per-unit for the primary, secondary and tertiary transformer sides.

The current phasor illustration shows that secondary and tertiary currents Isec, Iter comprise reactive components Isec_im, Iter_im of opposite signs. Thus, one of the first and second reactive powers Q1, Q2 injects an amount of reactive power to the transformer 208, while the other absorbs an amount of reactive power. In this example the amounts of reactive power absorbed and injected are equal in magnitude implying that the reactive power Ipri_im supplied to the grid is zero. Accordingly, the secondary and tertiary transformer sections Wsec, Wter merely circulates the reactive power generated by the first and second parallel connected DC-to-AC converters 231, 232.

The voltage phasor illustration in FIG. 3B shows an example where the tertiary voltage is aligned to the real axis. The secondary and tertiary currents Isec, Iter have reactive components of different sign, but unequal amplitudes. Due to the unequal amplitudes, only a portion of the reactive power is circulated in the secondary and tertiary transformer sections Wsec, Wter, while a remaining portion is absorbed by the trafo and injected/absorbed by the grid.

The differences in the reactive setpoint in the secondary and tertiary transformer sections, generates secondary and tertiary voltages Usec, Uter which have different magnitudes.

In this example, the first DC-to-AC converter 231 delivers a reactive power so that reactive current Isec_im is negative leading to an increase of the secondary voltage Usec. The second DC-to-AC converter 232 absorbs reactive power so that reactive current Iter_im is positive leading to a decrease of the tertiary voltage Usec—compared to a situation with zero reactive power.

Accordingly, by circulating an amount of reactive power between the secondary and tertiary transformer sections, it is possible to obtain different secondary and tertiary voltages Usec, Uter and to control the magnitudes by controlling the amount of reactive power being absorbed, respectively delivered by the first and second DC-to-AC converters 231, 232.

The first and second reactive powers would need to have different signs, i.e. so that one is injected to the grid while the other is received from the grid, in order to circulate an amount of reactive power between the secondary and tertiary windings Wsec, Wter. However, it is still possible to change the secondary and tertiary voltages Usec, Uter independently of each other, e.g. to achieve different voltages, if the first and second reactive powers have the same sign, but are changed independently, e.g. to achieve different reactive powers. For example, the second reactive power Q2 can be increased to a positive level, which is larger than the positive first reactive power Q1, in order to maintain Uter within a voltage range.

Thus, by changing the first and second reactive powers Q1, Q2 generated by the respective first and second DC-to-AC converters one of the first and second reactive powers can be increased while the other is decreased with amounts that are unequal so as to change the secondary and tertiary voltages Usec, Uter by unequal voltage levels.

Figure 4:
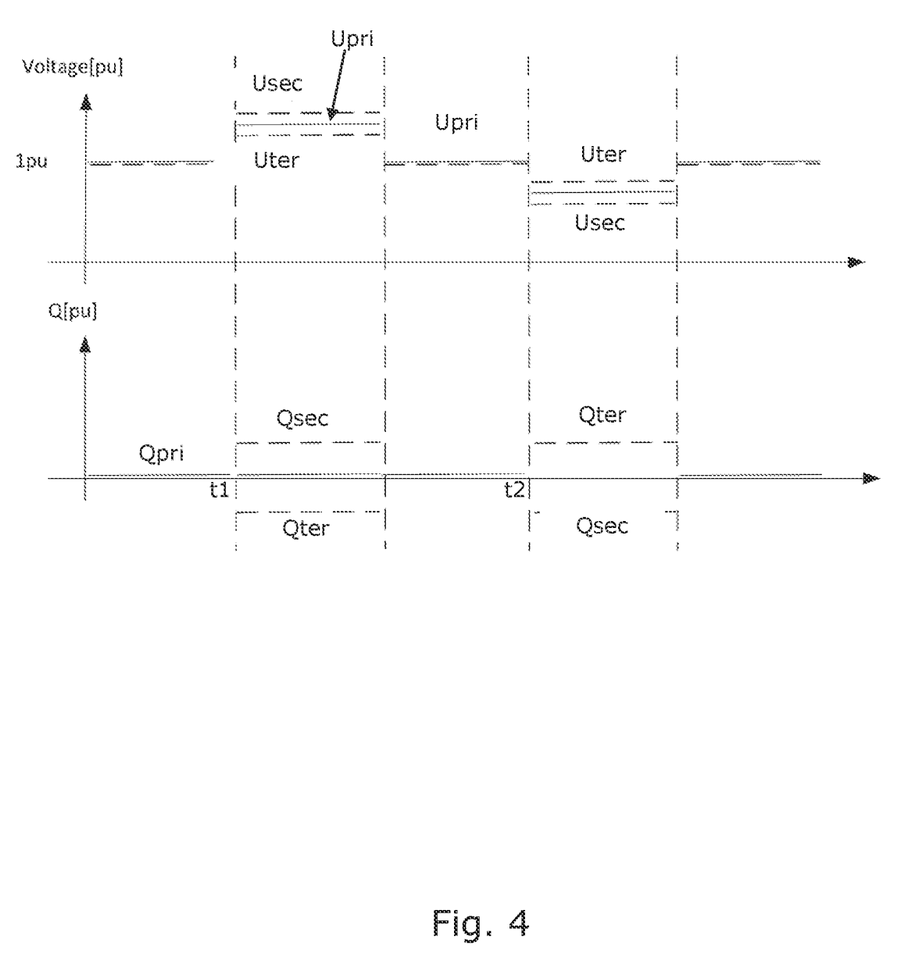
FIG. 4 shows an effect of generating first and second reactive powers having different signs, but equal magnitudes.

FIG. 4 corresponds to FIG. 2, but shows an effect of generating first and second reactive powers Q1, Q2 having different signs, but equal magnitudes. Again, magnitudes are shown in per-unit for the primary, secondary and tertiary transformer sides.

At t1, the grid voltage increases to a level which would lead to an unacceptable high tertiary voltage level Uter. However, by controlling the second DC-to-AC converter 232 to absorb a given amount of reactive power Q2, i.e. Q2 is negative, and by controlling the first DC-to-AC converter 231 to inject the same or substantially the same amount of reactive power Q1, i.e. Q1 is positive, the tertiary voltage level Uter can be maintained closer to 1 pu and within a desired range so that the auxiliary circuit 240 is not exposed to too high voltages. The secondary voltage Usec is increased due to the circulation of the reactive power. However, this is not a problem as long as the voltage is below a voltage limit of the first DC-to-AC converter 231.

The situation at t2 shows a corresponding situation where the tertiary voltage Uter is increased while the secondary voltage Usec is decreased by increasing the second reactive power Q2 to a positive level and decreasing the first reactive power Q1 to a negative value.

Figure 5A:
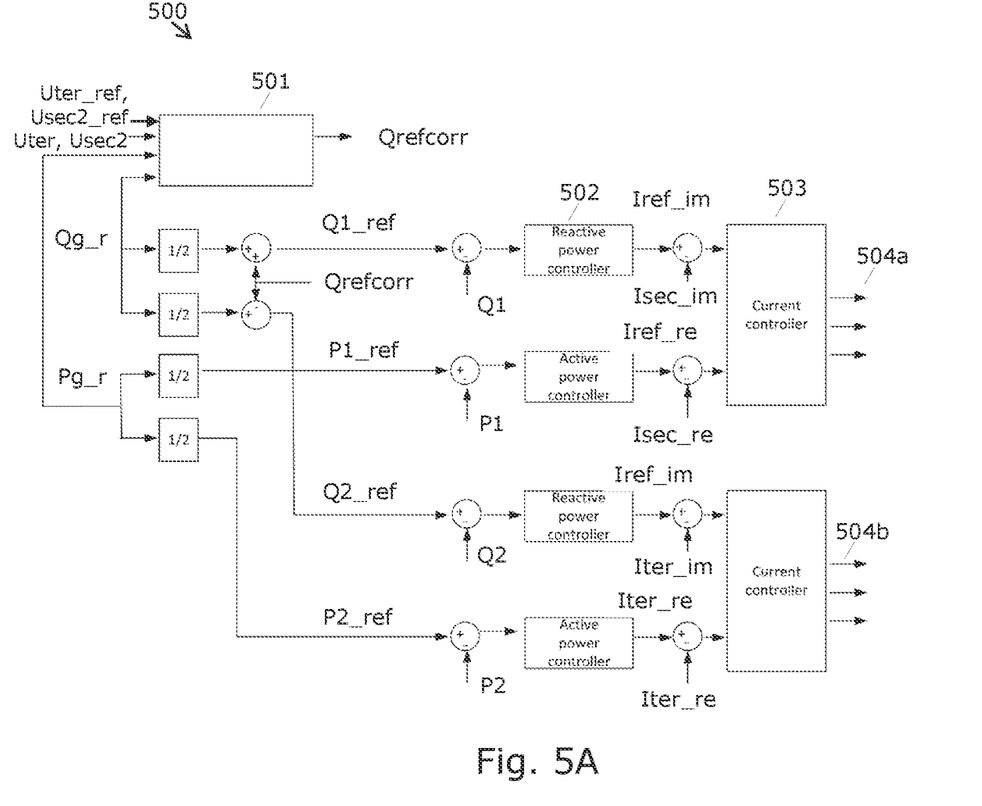
FIG. 5A shows an example of a controller arranged for controlling the first and second DC-to-AC converters for changing first and second reactive powers.

FIG. 5A shows an example of a controller 500 arranged for controlling the first and second DC-to-AC converters 231, 232 for changing first and second reactive powers Q1, Q2 generated by the respective first and second DC-to-AC converters according to a reactive correction reference Qrefcorr, so that one of the first and second reactive powers is increased while the other is decreased with amounts corresponding to the reactive correction reference Qrefcorr so that the first and second reactive powers are unequal and possible have different signs.

The controller 500 comprises a voltage controller 501 which determines the reactive correction reference Qrefcorr dependent on the actual tertiary voltage Uter and a voltage reference Uter_ref.

The controller 500 receives references for active and reactive grid powers, Qg_r, Pg_r. The active and reactive grid power references are divided by two for the determination of active and reactive converter power references Q1_ref, P1_ref, Q2_ref, P2_ref for the first and second DC-to-AC converters 231, 232. The reactive correction reference Qrefcorr is combined with the first and second reactive converter power references Q1_ref, Q2_ref, so that the reactive correction reference Qrefcorr is added to Q1_ref and subtracted from Q2_ref, or vice versa.

According to this example, the error between the converter references Q1_ref, P1_ref, Q2_ref, P2_ref and the actual first and second reactive and active powers Q1, Q2, P1, P2 are determined and supplied to reactive and active power controllers 502. The reactive and active power controllers 502 determines reactive current references Iref_im and active current references Iref_re used by the current controllers 503 in combination with actual reactive and active currents Isec_im, Isec_re, Iter_im, Iter_re to determine control signals 504a, 504b for the first and second DC-to-AC converters 231, 232.

The controller 500 can be designed in other ways than illustrated in FIG. 5A.

Figure 5B:
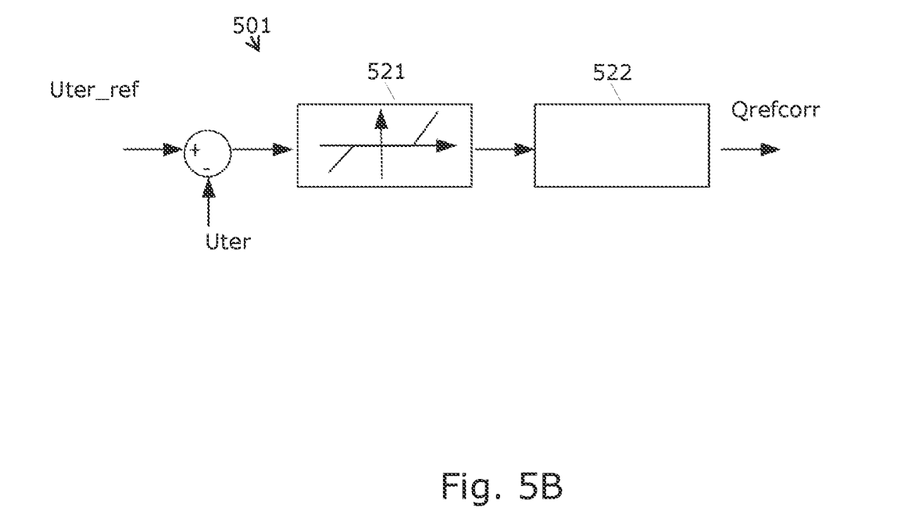
FIG. 5B shows an example of the voltage controller.

FIG. 5B shows an example of the voltage controller 501 wherein the voltage difference between actual tertiary voltage Uter and tertiary voltage reference Uter_ref is exposed to a dead band function 521 so that the reactive correction reference Qrefcorr is only determined if the voltage difference exceeds lower and upper thresholds defined by the dead band function 521. The reactive correction reference Qrefcorr is determined by a control function 522 such as a PI control function.

The dead band function 521 ensures that the adjustment of the tertiary voltage Uter is invoked as soon as a threshold of dead band function is exceeded.

The control of the first and second DC-AC converters 231, 232 for generating unequal reactive powers Q1, Q2 may be invoked by other conditions than the dead band thresholds, e.g. based on a voltage change on the power line 220, or a related voltage change. Thus, if the voltage on the power line 220 or other voltage exceeds a threshold, the first and second reactive powers Q1, Q2 may be controlled to change so as to meeting a condition such as the tertiary voltage reference Uter_ref.

According to an embodiment the reactive correction reference Qrefcorr is a user determined reference. Accordingly, Qrefcorr may be set independent of the tertiary voltage Uter and the corresponding voltage reference Uter_ref. For example, the correction reference Qrefcorr may be set to given value in order to generate a desired circulation of reactive power between the first and second DC-to-AC converters 231, 232. For example, the power the first and second DC-to-AC converters 231, 232 may be subject to a full current test, e.g. in order to test the power converters in the production where the converters are not allowed to exchange a high reactive power with the grid. The power converters 231, 232 are controlled to generate zero active power, but maximal reactive power. The maximal reactive power loading—in a situation with grid restriction to exchange reactive power—can be achieved by circulating reactive current with a magnitude corresponding the maximal current capacity of the power converters.

The power capacity of the first and second power converters 231, 232 may be limited according to a maximum apparent power, i.e. S1<S1_max where S1=SQRT(Q1^2+P1^2) for the first DC-AC power converter 231, and similarly for the second DC-AC power. Accordingly, if the reactive power Q1, Q2 is increased for any of the first and second DC-to-AC converters 231, 232 in order to maintain Uter sufficiently close to 1 pu, the apparent power S1, S2 for any of the first and/or the second DC-to-AC converters 231, 232 may need to be reduced by reducing the active power P1, P2 of the first and/or the second DC-AC power converter 231, 232.

Changing the active power P1, P2 of the first and/or the second DC-AC power converter 231, 232 may be restricted so that both the first and second active powers P1, P2 are adjusted by the same amount, i.e. both P1 and P2 are decreased.

The control of the active powers P1, P2 may be achieved by a limitation function (not shown) arranged to invoke a limitation of the active powers P1, P2 so that apparent power conditions S1_max=SQRT(Q1_ref^2+P1_ref^2) and S2_max=SQRT(Q1_ref^2+P1_ref^2) are met. According the control system 500 may be configured to adjust the active power references P1_ref, P2_ref subject to the apparent power conditions S1_max, S2_max.

Figure 6:
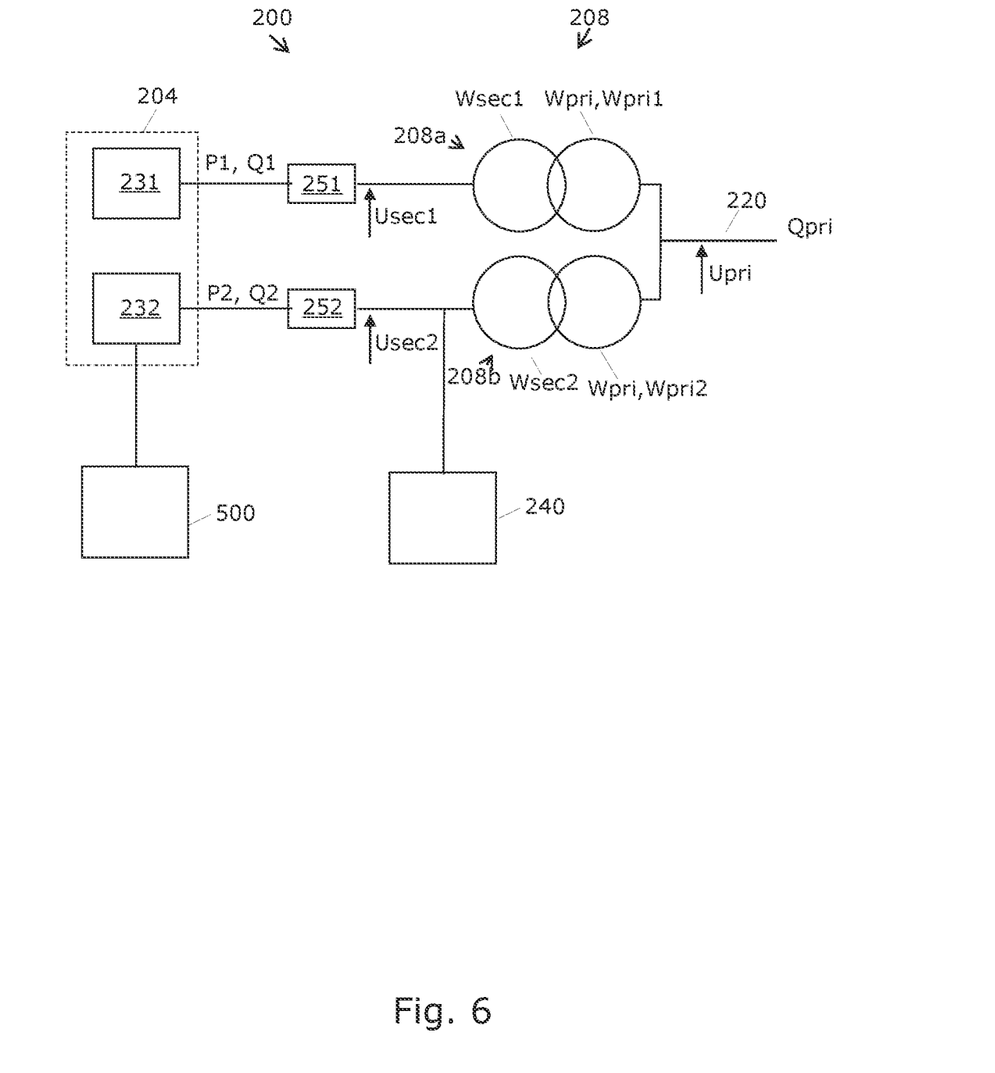
FIG. 6 shows another example of the power system.

FIG. 6 shows another example of the power system 200 which is equivalent to the system in FIG. 2B. In this example, the at least one transformer 208, comprises two parallel connected two-winding transformers 208a, 208b. The first transformer 208a comprises the first secondary section Wsec1 connected to the output of the first DC-to-AC converter 231, and a first primary section Wpri1 connected to the power line 220. The second transformer 208a comprises the second secondary section Wsec2 connected to the output of the second DC-to-AC converter 232, and a second primary section Wpri1 connected to the power line 220. The output terminals of the first and second primary sections Wpri1, Wpri2 are thus parallel connected to the power line 220.

The described alternatives of the at least one transformer 208 is therefore configured with at least one primary section Wpri, Wpri1, Wpri2 connected to the power line 220, with first and second secondary sections Wsec1, Wsec2 connected to outputs of the respective first and second DC-to-AC converters. In the example with the three-winding transformer, the first and second secondary sections Wsec1, Wsec2 are named as the secondary and tertiary sections Wsec, Wter, respectively.

For convenience, the examples of the three-winding transformer refer to the secondary voltage Usec and the tertiary voltage Uter for transformer voltages on the secondary and tertiary sections Wsec, Wter, respectively. The examples of the use of two two-winding transformers refer to the first secondary voltage Usec1 and the second secondary voltage Usec2 on the first and second secondary sections Wsec1, Wsec2, respectively.

Thus, Usec corresponds to Usec1, and Uter corresponds to Usec2.

The voltage reference Uter_ref for the desired voltage level at the input of the secondary section Wsec, alternatively the tertiary section Wter, is equivalent to the voltage reference Usec2_ref for the desired voltage level at the input of the first secondary section Usec1, alternatively the second secondary section Usec2.

Similarly Wsec corresponds to Wsec1 and Wter corresponds to Wsec2.

The invention claimed is:

1. A method for operating a power system of a wind turbine, wherein the power system comprises:
    first and second parallel connected DC-to-AC converters; and at least one transformer, wherein each transformer comprises a primary section connected to a power line, wherein the at least one transformer comprises first and second secondary sections connected to outputs of the respective first and second DC-to-AC converters, and wherein the second secondary section and the output of the second DC-to-AC converter are further connected to a power consuming device of the wind turbine, the method comprises:

provide a reactive correction reference;

providing the power consuming device a voltage within an operating voltage range of the power consuming device using a portion of electric power from the second secondary section or from the output of the second DC-to-AC converter; and in response to a change in a voltage on the power line, changing first and second reactive powers generated by the respective first and second DC-to-AC converters according to the reactive correction reference, so that one of the first and second reactive powers is increased while the other is decreased with amounts corresponding to the reactive correction reference so that (i) the first and second reactive powers are unequal, (ii) an amount of reactive power is circulated between the first and second secondary sections of the at least one transformer, and (iii) the voltage provided to the power consuming device remains within the operating voltage range.

2. The method of claim 1, further comprising changing the first and second reactive powers to achieve different signs of the first and second reactive powers.

3. The method of claim 1, wherein the reactive correction reference is a user determined reference.

4. The method of claim 1, wherein the reactive correction reference is determined based on a comparison of (i) a voltage level at an input of the first secondary section or at an input of the second secondary section and (ii) a voltage reference for a desired voltage level at the input of the first secondary section or at the input of the second secondary section.

5. The method of claim 4, wherein the change of the first and second reactive powers causes an increase of the voltage level at the input of the first secondary section and a decrease of the voltage level at the input of the second secondary section, or vice versa.

6. The method of claim 4, further comprising determining a condition indicating a need for changing the voltage level at the input of the first secondary section or at the input of the second secondary section towards the desired voltage level at the input of the first secondary section or at the input of the second secondary section.

7. The method of claim 6, wherein the condition is determined based on a voltage change on the power line, or a related voltage change.

8. The method of claim 1, further comprising changing an amount of active power supplied by the first or the second DC-to-AC converter to the first and second secondary transformer sections dependent on the first reactive power or the second reactive power.

9. The method of claim 8, wherein the change of the active power of the first or the second DC-to-AC converter is determined dependent on the first or second reactive power and an apparent power capacity of the first and second DC-to-AC converters.

10. The method of claim 1, wherein the power system comprises controllers arranged to control the first and second reactive powers of the respective first and second DC-to-AC converters based on respective first and second reactive references, and wherein the method comprises:

changing the first and second reactive references according to the reactive correction reference, so that one of the first and second reactive references is increased while the other is decreased, thereby causing the change of the first and second reactive powers.

11. The method of claim 1, wherein the least one transformer, comprises first and second transformers, where each of the transformers comprises one of the primary sections, where the first transformer comprises the first secondary section connected to the output of the first DC-to-AC converter, and where the second transformer comprises the second secondary section connected to the output of the second DC-to-AC converter.

12. The method of claim 1, wherein the first and second secondary sections are secondary and tertiary sections, respectively, of a three-winding transformer.

13. A control system comprising first and second parallel connected DC-to-AC converters and at least one transformer, wherein each transformer comprises a primary section connected to a power line, wherein the at least one transformer comprises first and second secondary sections connected to outputs of the respective first and second DC-to-AC converters, wherein the second secondary section and the output of the second DC-to-AC converter are further connected to a power consuming device, and wherein the control system is arranged to perform an operation, comprising:

providing a reactive correction reference;

providing the power consuming device a voltage within an operating voltage range of the power consuming device using a portion of electric power from the second secondary section or from the output of the second DC-to-AC converter; and in response to a change in a voltage on the power line, changing first and second reactive powers generated by the respective first and second DC-to-AC converters according to the reactive correction reference, so that (i) one of the first and second reactive powers is increased while the other is decreased with amounts corresponding to the reactive correction reference so that the first and second reactive powers are unequal, (ii) an amount of reactive power is circulated between the first and second secondary sections of the at least one transformer, and (iii) the voltage provided to the power consuming device remains within the operating voltage range.

14. The control system of claim 13, wherein the operation further comprises changing the first and second reactive powers to achieve different signs of the first and second reactive powers.

15. The control system of claim 13, wherein the reactive correction reference is a user determined reference.

16. The control system of claim 13, wherein the reactive correction reference is determined based on a comparison of (i) a voltage level at an input of the first secondary section or at an input of the second secondary section and (ii) a voltage reference for a desired voltage level at the input of the first secondary section or at the input of the second secondary section.

17. The control system of claim 13, wherein the change of the first and second reactive powers causes an increase of a voltage level at an input of the first secondary section and a decrease of the voltage level at the input of the second secondary section, or vice versa.

18. A wind turbine, comprising:
a tower:
a nacelle disposed on the tower;
a generator housed in the nacelle;
a rotor extending from the generator and having a plurality of blades disposed on a distal end thereof;
a control system, comprising:
  first and second parallel connected DC-to-AC converters; and
  at least one transformer, wherein each transformer comprises a primary section connected to a power line, wherein the at least one transformer comprises first and second secondary sections connected to outputs of the respective first and second DC-to-AC converters, wherein the second secondary section and the output of the second DC-to-AC converter are further connected to a power consuming device of the wind turbine, and wherein the control system is arranged to perform an operation, comprising:
  providing a reactive correction reference;
  providing the power consuming device a voltage within an operating voltage range of the power consuming device using a portion of electric power from the second secondary section or from the output of the second DC-to-AC converter; and
  in response to a change in a voltage on the power line, changing first and second reactive powers generated by the respective first and second DC-to-AC converters according to the reactive correction reference, so that (i) one of the first and second reactive powers is increased while the other is decreased with amounts corresponding to the reactive correction reference so that the first and second reactive powers are unequal, (ii) an amount of reactive power is circulated between the first and second secondary sections of the at least one transformer, and (iii) the voltage provided to the power consuming device remains within the operating voltage range.

19. The wind turbine of claim 18, wherein the operation further comprises changing the first and second reactive powers to achieve different signs of the first and second reactive powers.

20. The wind turbine of claim 18, wherein the reactive correction reference is a user determined reference.

* * * * *